(12) United States Patent
Pierbattista et al.

(10) Patent No.: US 11,199,389 B2
(45) Date of Patent: Dec. 14, 2021

(54) SYSTEM AND METHOD FOR CONTROLLING A DRILL AND BLAST EVENT

(71) Applicant: Accenture Global Solutions Limited, Dublin (IE)

(72) Inventors: Marco Pierbattista, Warsaw (PL); Pablo F. Hidalgo, Barcelona (ES); Anna Kwiecinska, Warsaw (PL); Piotr Cwiklinski, Warsaw (PL)

(73) Assignee: Accenture Global Solutions Limited, Dublin (IE)

( * ) Notice: Subject to any disclaimer, the term of this patent is extended or adjusted under 35 U.S.C. 154(b) by 357 days.

(21) Appl. No.: 16/360,313

(22) Filed: Mar. 21, 2019

(65) Prior Publication Data

US 2019/0293400 A1    Sep. 26, 2019

(51) Int. Cl.
*G05B 21/00* (2006.01)
*G01M 1/38* (2006.01)
(Continued)

(52) U.S. Cl.
CPC .............. *F42D 3/04* (2013.01); *E21B 49/00* (2013.01); *E21C 37/00* (2013.01); *E21C 37/16* (2013.01);
(Continued)

(58) Field of Classification Search
CPC . F42D 3/04; E21B 49/00; E21B 7/025; E21C 37/00; E21C 37/16; G05B 15/02; G06Q 50/02

See application file for complete search history.

(56) References Cited

U.S. PATENT DOCUMENTS 6,772,105 B1    8/2004    Heck, Sr.
2009/0240481 A1*  9/2009  Durrant-Whyte ...... G06Q 10/06
                                                                703/7
(Continued)

FOREIGN PATENT DOCUMENTS

EP    2915950 A1    9/2015
GB    2472508 A     2/2011
(Continued)

OTHER PUBLICATIONS

Monte Carlo simulation as a tool to predict blasting fragmentation based on the Kuz-Ram model (Year: 2005).*
(Continued)

*Primary Examiner* — Zhipeng Wang
(74) *Attorney, Agent, or Firm* — Plumsea Law Group, LLC

(57) ABSTRACT

A blast plan control system and method used to control a drill and blast event is disclosed. The system and method customizes results for specific conditions. The system can receive certain inputs, such as conditions of the area to be blasted and the desired rock fragment size, and use these inputs to output a plurality of blast plans characterized by a set of characteristics that achieve the desired fragmentation size. A user can select a blast plan for execution from the plurality of blast plans. When the control system receives a selected blast plan, the control system can generate a work order for the selected blast plan and communicate the work order to operators and/or drilling equipment associated with execution of the drill and blast event. The operators and/or drilling equipment can then prepare for and execute the selected blast plan.

20 Claims, 9 Drawing Sheets

(51) Int. Cl.
- *G05B 13/00* (2006.01)
- *G05B 15/00* (2006.01)
- *G05D 23/00* (2006.01)
- *F42D 3/04* (2006.01)
- *E21B 49/00* (2006.01)
- *E21C 37/00* (2006.01)
- *G05B 15/02* (2006.01)
- *E21C 37/16* (2006.01)
- *E21B 7/02* (2006.01)
- *G06Q 50/02* (2012.01)

(52) U.S. Cl.
 CPC .............. *G05B 15/02* (2013.01); *E21B 7/025* (2013.01); *G06Q 50/02* (2013.01)

(56) References Cited

U.S. PATENT DOCUMENTS

| | | | | |
|---|---|---|---|---|
| 2014/0144342 | A1* | 5/2014 | Bye | E21C 41/30 |
| | | | | 102/311 |
| 2016/0313107 | A1* | 10/2016 | Birkin | F42D 1/055 |
| 2018/0010437 | A1 | 1/2018 | Reid et al. | |

FOREIGN PATENT DOCUMENTS

| | | |
|---|---|---|
| WO | 2007096734 A1 | 8/2007 |
| WO | 2012048368 A1 | 4/2012 |

OTHER PUBLICATIONS

Tutorial of I-Blast software User's guide 3 : Fragmentation & Fly-Rock simulation I-Blast 4—Tutorial Blast Design Software a BNA-Blast Technology developped by Thierry Bernard Technologie (Year: 2014).*

Response to Written Opinion of European Search report as filed on Jul. 29, 2020 for European Patent Application No. 19164076.2.
CEED Seminar Proceedings; Evaluation of HSBN.2009. CEED Seminar Proceedings; Evaluation of HSBN.2009.https://ceed.wa.edu.au/wpcontent/uploads/2017/02/19.Nathan.Oldfield.pdf.
Brighton Conference Proceedings 2005, R. Holmberg et al. 2005 European Federation of Explosives Engineers. https://miningandblasting.files.wordpress/2009/09/the-kuz-ram-fragmentation-model-e28093-20-years-on.pdf.
Spanish Search Report dated Jul. 13, 2018 for Spanish Patent Application No. P201830277.
Thierry Bernard Technologie: "Tutorial of I-Blast software User's guide 3: Fragmentation & Fly-Rock simulation I-Blast 4—Tutorial Blast Design Software a DNA-Blast Technology developed by Thierry Bernard Technologie for a Million Dollar Benefit User's guide 3: Fragmentation & Fly-Rock Simulation", Nov. 8, 2014, XP055608116, Retrieved from the internet: https://documents.pub/document/tbt-for-n-017-al-en-tutorial-i-blast-fragmentationpdf.html; retrieved on Jul. 23, 2019.
O-Pitblast: "Blast Design & Optimization Platform User Manual", Dec. 31, 2017, XP055608125, retrieved from the internet: https://forcit.fi/assets/Uploads/O-Pitblast-Manual-v1.3.0.pdf ; retrieved on Jul. 23, 2019.
Joseph Appianing et al.: "Optimisation or Drill and blast Parameters Using Empirical fragmentation Modelling Optimisaion of Drill and Blast Parameters Using Emperical Fragmentation Modelling", the UJMaT Biennial International Mining and Mineral Conference. Aug. 6, 2016, pp. 25-29, XP055608190, Tarkwa, Ghana ; retrieved from the internet: https://www.researchgate.net/profile/Bruno_Kansake/publication/306033693_Optimisation_of_Drill_and_Blast_Parameters_Using_Empirical_Fragmentation_Modelling/links/5a928e6345851535bcd80b4d/Optimisation-of-Drill-and-Blast-Parameters-Using-Empirical-Fragmentation-Modelling.pdf[retrieved on Jul. 23, 2019].
Extended European Search Report dated Aug. 1, 2019 for European Patent Application No. 19164076.2.

* cited by examiner

FIG. 5

| | | | CREATE WORK ORDER |
|---|---|---|---|
| OTHER FACTORS | | | 504 |
| ROCK CHARACTERISITICS | | | ▲ |

| ROCK TYPE | JOINT CONDITION FACTOR | VERTICAL JOINT PLANE ANGLE | ROCK DENSITY | 3 |
|---|---|---|---|---|
| | | | YOUNG'S MODULUS Y (Gpa) 506 | 60 |
| ○ FRIABLE | | | UNCONFINED COMPRESSIVE STRENGTH UCS (Mpa) 508 | 100 |
| ⊚ MASSIVE | | 502 | | |
| ○ JOINTED | | | COMPRESSIONAL STRESS WAVE VELOCITY (Mpa) | 5 |
| JOINT SPACING | | | | |

FIG. 6

| | | CREATE WORK ORDER |
|---|---|---|
| OTHER FACTORS | | |
| ROCK CHARACTERISITICS | 614 | ▽ |
| BENCH AND DRILL PARAMETERS | | ▲ |

| P80 vs | P50 vs | | BENCH LENGTH (M) | 150 |
|---|---|---|---|---|
| ○ B | ○ L | ○ RWS | BENCH DEPTH (M) 616 | 70 |
| ○ D | ⊚ H | ○ TB | STANDARD DEVIATION DRILLING PRECISION (m) 618 | 0.2 |
| ○ S | ○ Q | | STANDARD DEVIATION INITIATION PRECISION (m) 620 | 4 |

DESIRED 80% PASSING ROCK SIZE (cm)

10 — 60 65 — 200

BLASTING COST ▽

700

| | CREATE WORK ORDER |
|---|---|
| OTHER FACTORS | |
| ROCK CHARACTERISITICS | ▽ |
| BENCH AND DRILL PARAMETERS | ▽ |
| BLASTING COST | △ |

| EXPLOSIVE COST ($/kg) | 0.82491 | PRIMER COST ($/HOLE) | 708 — 5.32 |
| CONNECTOR COST ($/HOLE) | 702 — 0 | DRILLING COST ($/m) | 22.54 |
| DETONATOR COST ($/HOLE) | 704 — 28.91 | SUM OF MISCELLANEOUS COSTS ($/m) | 50 |

SYSTEM AND METHOD FOR CONTROLLING A DRILL AND BLAST EVENT

CROSS-REFERENCE TO RELATED APPLICATIONS

This application claims the priority benefit of Spanish Patent Application Number P201830277, filed Mar. 21, 2018, and titled "System and Method for Controlling a Drill and Blast Event," which is incorporated by reference herein in its entirety.

TECHNICAL FIELD

The present disclosure generally relates to Drill and Blast ("DB") events. More specifically, the present disclosure generally relates to a system and method for controlling DB events.

BACKGROUND

Drilling and blasting is a way of extracting minerals from open-pit mines. During a DB event, holes are drilled into a rock bench, explosives are inserted into the holes, and the explosives are detonated to blast rock benches into rock fragments. Then, the rock fragments are processed to extract minerals. One difficulty with using DB events is achieving a certain rock fragment size. Rock fragments that are too small make the process of extracting the minerals from the rock fragments slower because the rock is too pulverized. Rock fragments that are too large will have to be further broken down, which adds another step to the process of extracting minerals from rock.

There is a need in the art for a system and method that addresses the shortcomings discussed above.

SUMMARY

A blast plan control system and method used to control DB events is disclosed. The system and method solves the problems discussed above by optimizing the size of rock fragments resulting from the DB events. The system and method customizes results for specific conditions. The system can receive certain inputs, such as conditions of the area to be blasted and the desired rock fragment size, and use these inputs to output a plurality of blast plans characterized by a set of characteristics that achieve the desired fragmentation size.

The disclosed system and method improves the precision, cost, and efficiency of DB events by providing the blast plan that will achieve the desired outcome. Using a blast plan that is known to achieve the desired results reduces waste by allowing the operators to use only the amount of resources necessary to achieve the desired results. The disclosed system and method improves its own efficiency by eliminating blast plan options that are inapplicable under the particular circumstances (e.g., drill lengths that are longer than the equipment to be used can drill or hole diameters that are too small to hold enough explosive).

In one aspect, the disclosure provides a method of controlling a drill and blast event. The method may include receiving, by a control system, a desired rock fragment size for a desired percentage of the population of rock fragments resulting from the drill and blast event. The method also may include receiving, by the control system, drill and blast event characteristic inputs. The method may include determining, by the control system, simulation variables. The method further may include generating, by the control system, multiple drill and blast event scenarios based on drill and blast characteristic inputs and simulation variables. The method further yet may include determining, by the control system, drill and blast event scenarios comprising drill and blast event specifications for drill and blast events that result in the desired rock fragment size for a desired percentage of the population of rock fragments. The method may include receiving, by the control system, drill and blast event specifications selected from the multiple drill and blast event scenarios. The method may include communicating, by the control system, the selected drill and blast event specifications to at least one of (a) the operators responsible for executing the drill and blast event and (b) the drilling equipment to be used during execution of the drill and blast event.

In another aspect, the above-mentioned drill and blast characteristic inputs may include at least one of rock characteristics and bench characteristics of a rock bench that is a target of the selected drill and blast event.

In another aspect, the above-mentioned drill and blast characteristic inputs may include drill parameters of equipment that is to be used in the selected drill and blast event.

In another aspect, the method may include determining, by the control system, constraints for the simulation variables, wherein the constraints are used in determining the simulation variables.

In another aspect, the above-mentioned constraints may be based on the drill and blast event characteristic inputs.

In another aspect, the above-mentioned simulation variables and the drill and blast event characteristic inputs may be used in a Kuz-Ram rock fragmentation model when determining, by the control system, drill and blast event scenarios.

In another aspect, the method may include executing the selected drill and blast event by at least one of (a) the operators responsible for executing the selected drill and blast event and (b) the drilling equipment to be used during execution of the selected drill and blast event.

In another aspect, the method may include preparing and submitting, by the control system, an order of material for implementing the drill and blast event.

In another aspect, the above-mentioned drill and blast event specifications may include the measurements of holes that are to be drilled into a rock bench that is a target of the selected drill and blast event.

In another aspect, the method may include plotting, by the control system, rock fragmentation sizes resulting from multiple drill and blast event scenarios against the drill and blast event specifications correlating with the respective drill and blast event scenario.

In another aspect, the above-mentioned drill and blast event specifications may include an amount of resources for use in the selected drill and blast event.

In another aspect, the above-mentioned amount of resources may include material for implementing the drill and blast event.

In another aspect, the method may include generating, by the control system, a work order including the drill and blast event specifications of the selected drill and blast event, wherein communicating, by the control system, selected the drill and blast event specifications to at least one of (a) the operators responsible for executing the drill and blast event and (b) the drilling equipment to be used during execution of the drill and blast event may include sending the work order to at least one of (a) the operators responsible for executing the drill and blast event and (b) the drilling equipment to be used during execution of the drill and blast event.

In yet another aspect, the disclosure provides a non-transitory computer-readable medium storing software comprising instructions executable by one or more computers which, upon such execution, cause the one or more computers to perform the method described above.

In yet another aspect, the disclosure provides a control system for controlling a drill and blast event, including one or more computers and one or more storage devices storing instructions that are operable, when executed by the one or more computers, to cause the one or more computers to perform the method described above.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 5 is a schematic diagram of an embodiment of an interface display displaying rock characteristics;

FIG. 6 is a schematic diagram of an embodiment of an interface display displaying bench and drill parameters;

FIG. 7 is a schematic diagram of an embodiment of an interface display displaying prices of components;

DESCRIPTION OF EMBODIMENTS

A blast plan control system and method used to control DB events is disclosed. The system and method improves the process of DB events by optimizing the size of rock fragments resulting from the DB events. The system and method customizes results for specific conditions. More specifically, the system and method can customize results for the characteristics of the rock bench to be blasted. For example, as described in more detail below, the system can receive a desired rock fragmentation size and the characteristics of the rock bench to be blasted, and output a plurality of blast plans characterized by a set of characteristics that achieve the desired fragmentation size. In addition to the characteristics of the rock bench to be blasted, the system can customize results for various other conditions for the DB event, such as characteristics of desired results and/or the characteristics of the equipment used for the DB event.

The control system generates multiple DB event scenarios based on the characteristics of the rock bench to be blasted. These scenarios include DB event scenarios that achieve the desired results. A user may analyze the DB event scenarios and select a particular DB event from the DB event scenarios. When the control system receives a selected blast plan for execution, the control system can communicate specifications that define the blast plan for the DB event to operators responsible for executing the drill and blast event and/or drilling equipment to be used during execution of the drill and blast event. For example, when the control system determines a selected blast plan for execution, the control system can generate a work order for the selected blast plan and communicate the work order to operators responsible for executing the drill and blast event and/or to drilling equipment to be used during execution of the drill and blast event. The operators and/or drilling equipment can then prepare for and execute the selected blast plan. (Throughout the present application "rock fragment size" and "rock fragmentation size" are used interchangeably to describe the size of pieces of broken rock resulting from a DB event.)

Figure 1:
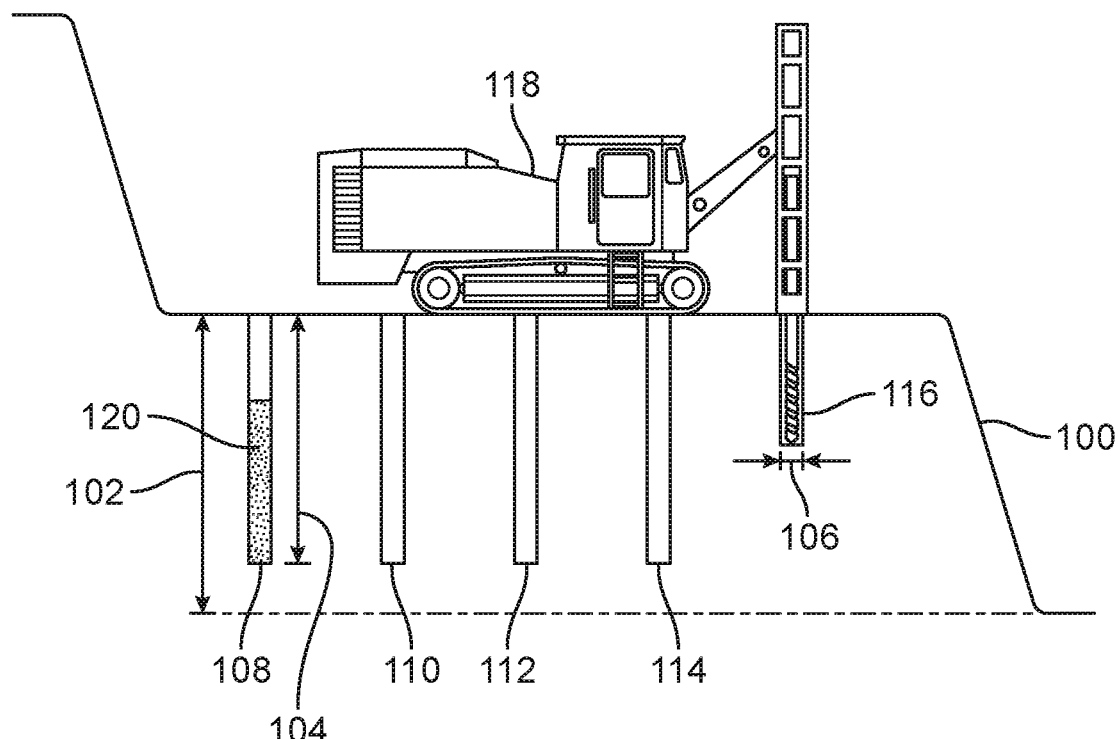
FIG. 1 is a schematic diagram of an embodiment of a drilling machine drilling a hole into a rock bench.
Figure 2:
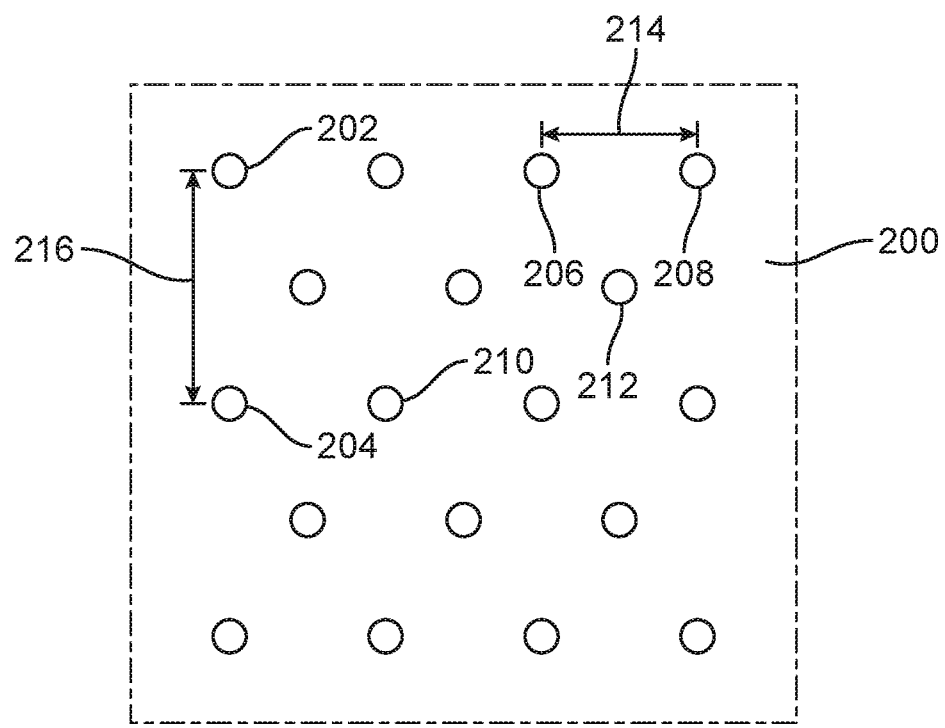
FIG. 2 is a schematic diagram of an embodiment of a top view of a staggered drilling pattern on a rock bench.

DB events involve drilling holes into rock benches, filling the holes with explosive, and detonating the explosive to blast the rock bench into rock fragments. FIGS. 1 and 2 show parameters that are included in DB event specifications. A DB event has specifications for various parameters that affect rock fragment size resulting from the DB event. FIG. 1 shows a rock bench 100 having a height H indicated by reference number 102. During DB events, drilling machines can be used to drill holes into the top of a rock bench. For example, FIG. 1 shows a drilling machine 118 drilling a fifth hole 116. In FIG. 1, a first hole 108, a second hole 110, a third hole 112, and a fourth hole 114 are already drilled into rock bench 100. The holes dug for a DB event each have a length L and diameter D. For example, a length L of first hole 108 is indicated by reference number 104 and a diameter D of fifth hole 116 is indicated by 106. The length and diameter of the holes, as well as the number of holes, affect the rock fragment size of the rock fragments resulting from a DB event. During the DB event, the holes are filled with explosive. For example, as shown in FIG. 1, first hole 108 is filled with explosive 120. The type and amount of explosive filling the holes also affect the rock fragment size of the rock fragments resulting from a DB event.

The pattern of the holes and the spacing between holes are other factors affecting the rock fragment size of the rock fragments resulting from a DB event. FIG. 2 shows a top view of a rock bench 200 prepared for a blast. Holes have been drilled in a staggered pattern in the top of rock bench 200. The staggered pattern includes columns of holes. For example, a first hole 202 is aligned in a first column with a second hole 204. In another example, a third hole 206 is aligned in a second column of three holes and a fourth hole is aligned in a third column of three holes. The staggered pattern also includes rows of holes. For example, first hole 202, third hole 206, and fourth hole 208 are all aligned in a first row and second hole 204 and a fifth hole 210 are aligned in a second row. The staggered pattern includes a burden B defining the spacing between the rows. For example, reference number 216 indicates the spacing between the holes in the first row and the holes in the second row in FIG. 2. The staggered pattern includes a spacing S defining the spacing between columns. For example, reference number 214 indicates the spacing between the holes in the second column and the holes in the third column in FIG. 2. The staggered pattern includes holes disposed between the rows and columns. For example, a sixth hole 212 is disposed between the first and second rows, and sixth hole 212 is also disposed between the second column including third hole 206 and the third column including fourth hole 208. The staggered holes have their own rows and columns. For example, sixth hole 212 is part of a row of staggered holes that are disposed between the first and second rows. Sixth hole 212 is also part of a column of staggered holes that are disposed between the second and third columns.

Figure 11:
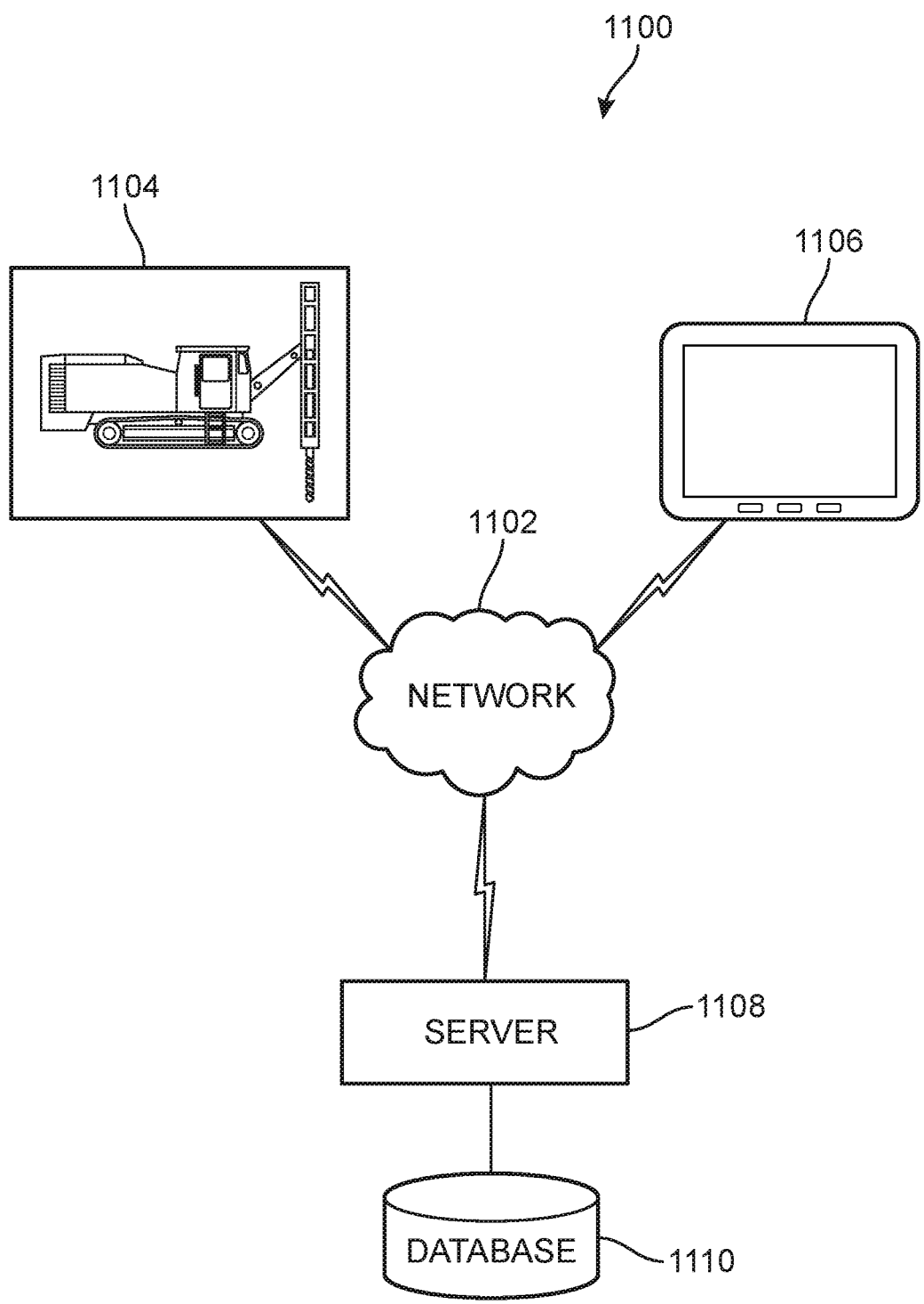
FIG. 11 shows a blast plan control system.

The blast plan control system may include one or more user devices, one or more drilling equipment devices, a server, a database, and a network. For example, FIG. 11 illustrates an example of a blast plan control system 1100. Blast plan control system 1100 includes a drilling equipment device 1104, a user device 1106, a network 1102, a server 1108, and a database 1110. The components of the blast plan control system communicate through the network. In some embodiments, the network may be a wide area network ("WAN"), e.g., the Internet. In other embodiments, the network may be a local area network ("LAN"). For example, in a more remote location far from a metropolitan area, the Internet may not be available. In yet other embodiments, the network may be a combination of a WAN and a LAN.

User device 1106 is discussed in more detail below with respect to FIG. 3. User device 1106 may include one or more user devices. Similarly, drilling equipment device 1104 may include one or more devices. The drilling equipment device can be a user device built into drilling equipment that can communicate with other devices through an Internet of Things platform. The drilling equipment may also include sensors that communicate with other devices, such as user devices and drilling equipment, through the Internet of Things platform. Drilling equipment can include any machinery used in DB events. For example, drilling equipment can include a drilling machine, a truck, or a processing machine.

The server may be a single computer, the partial computing resources of a single computer, a plurality of computers communicating with one another, or a network of remote servers (e.g., cloud). In the example of FIG. 11, server 1108 is in communication with database 1110. The server can work with the database to perform the method of the blast plan control system.

As discussed below, the disclosed blast plan control system determines DB event specifications, such as hole measurements (e.g., length and diameter), hole spacing (e.g., spacing between rows and columns of holes), and explosive characteristics (e.g., mass of explosive per hole), that achieve a desired rock fragment size. To determine which DB event achieves a desired rock fragment size, the blast plan control system may generate multiple DB event scenarios based on characteristics of the rock bench that is to be blasted. The blast plan control system may analyze the multiple DB event scenarios to determine which DB event scenarios result in the desired rock fragment size.

Figure 9:
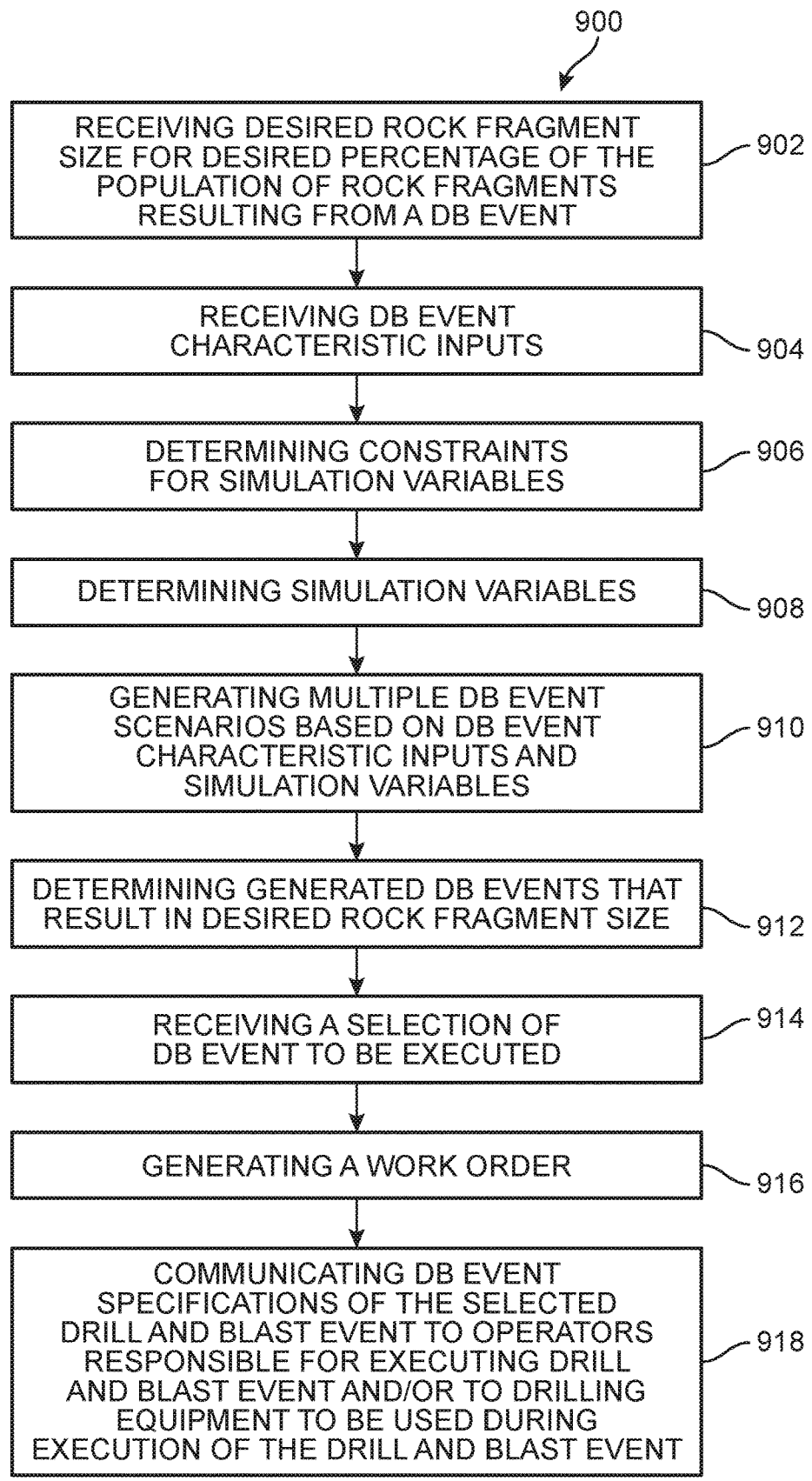
FIG. 9 shows a computer-implemented method for controlling a drill and blast event.
Figure 10:
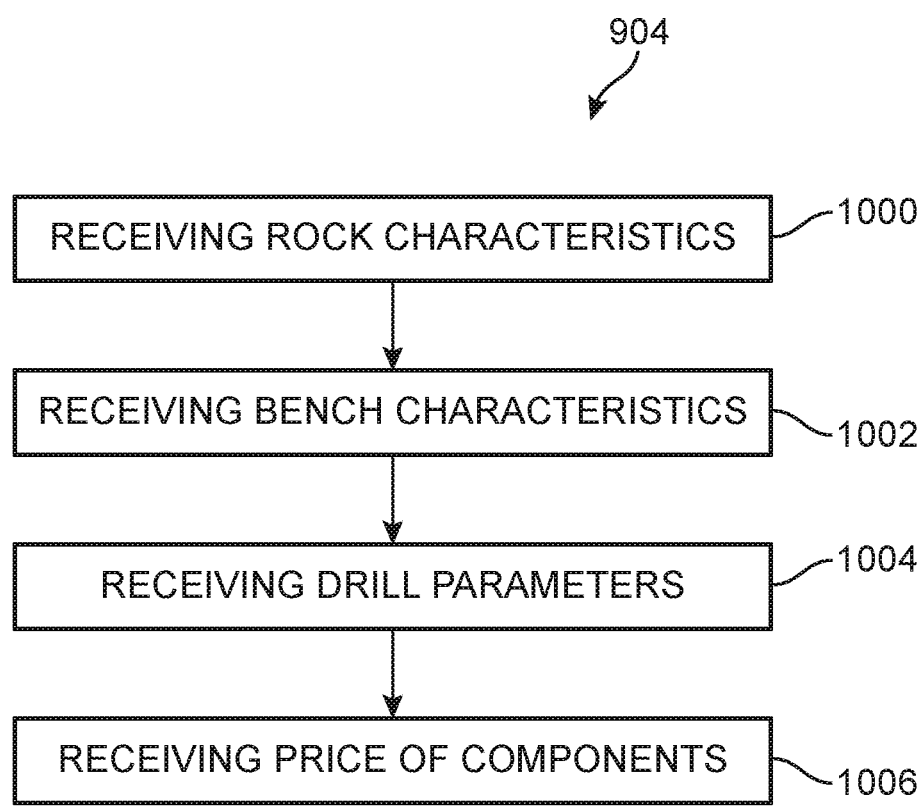
FIG. 10 shows additional steps for receiving DB event characteristic inputs.

FIG. 9 shows an example of a computer-implemented method 900 (or method 900) for controlling a drill and blast event. To start the process of generating blast plan scenarios, the system receives user inputs. For example, method 900 includes a step 902 of receiving a desired rock fragment size for a desired percentage of the population of rock fragments resulting from a DB event. Method 900 also includes a step 904 of receiving DB event characteristic inputs. FIG. 10 gives examples of substeps that may be involved in receiving DB event characteristics. For example, step 904 of receiving DB event characteristic inputs may include a substep 1000 of receiving rock characteristics. Step 904 of receiving DB event characteristic inputs may also include a substep 1002 of receiving bench characteristics. Step 904 of receiving DB event characteristic inputs may include a substep 1004 of receiving drill parameters. Step 904 of receiving DB event characteristic inputs may include a substep 1006 of receiving price of components. It is understood that one or more of the substeps listed in FIG. 10 may be performed when the blast plan control system receives DB event characteristics.

The user inputs can come from one or more sources. In some embodiments, the user inputs can come from one or more sources at different times. For example, as discussed in more detail below with respect to FIG. 3, an operator at the blast area (such as an open-pit mine or quarry) can input structural characteristics of one or more rock benches in a blast area before the DB event takes place. These structural characteristics are stored in a database, so that the characteristics can be retrieved at a later time. Then, when it is time to determine a blast plan, a user inputs the rock bench to be drilled and blasted, as well as the desired rock fragment size. The user could do this from the blast area or in a location that is remote from the blast area. Using the structural characteristics of the rock bench previously inputted by the operator, the database populates certain parameters based on the selected rock bench. The graphical interface is editable such that the parameters populated by the database may be interactively changed to the display, in real time, by a user.

In other embodiments, the user inputs can come from one source in a single entry. For example, an operator may know which rock bench is to be blasted, and provides structural characteristics of the rock bench to be drilled and blasted closer to when it is time to determine a blast plan. These structural characteristics are stored in a database, so that the characteristics can be retrieved at a later time.

Figure 3:
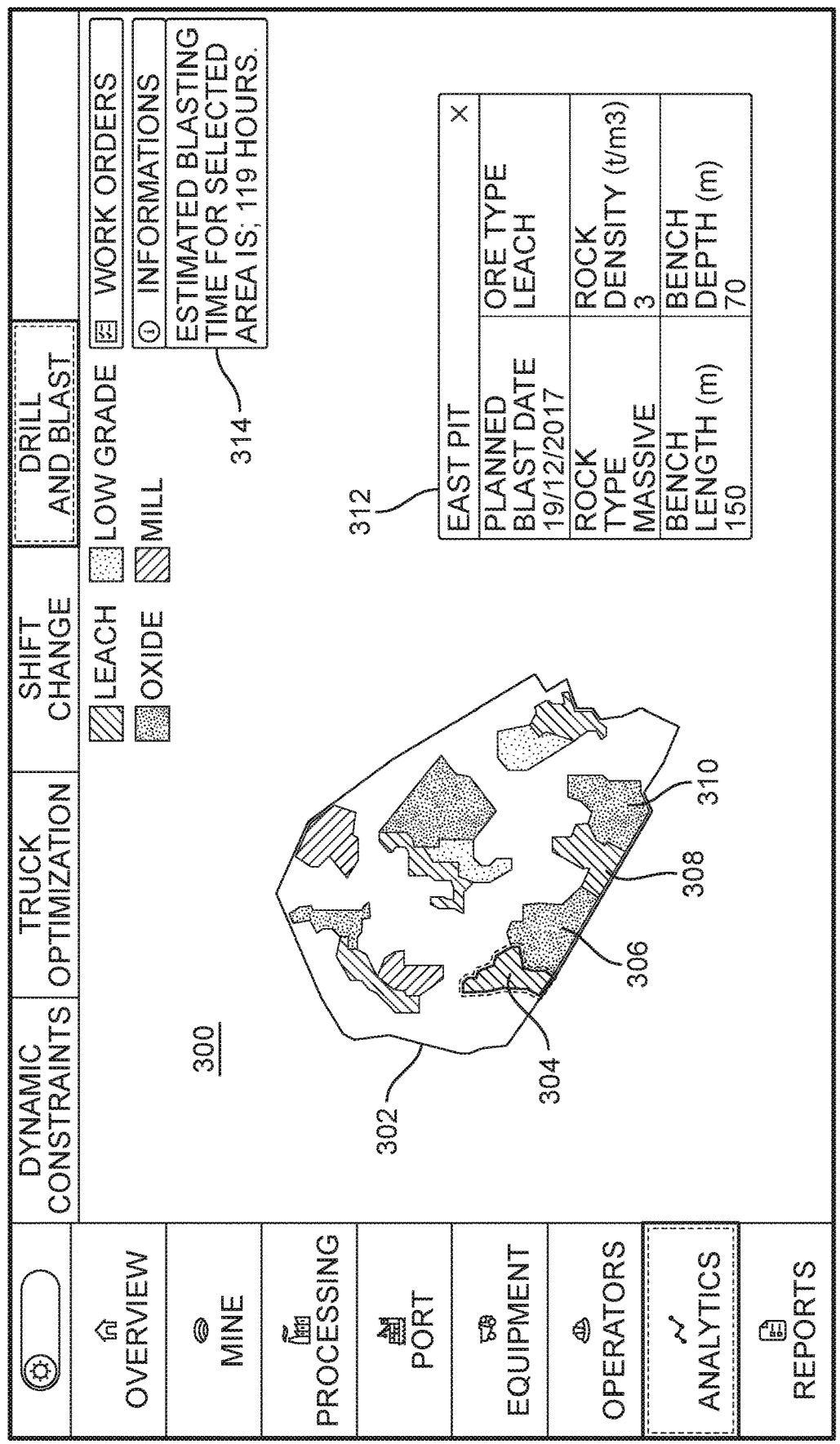
FIG. 3 is a schematic diagram of an embodiment of an interface display displaying a map of a blast area, as well as information about a selected rock bench.

FIG. 3 shows an example of an interface display 300 for selecting a rock bench of a blast area. This interface display, as well as any other interface displays discussed, may be provided on a user device. The user device may be a computing device used by a user. For example, as shown in FIG. 11, user device 1106 may include a tablet computer. In other examples, user device 1106 may be a smart phone, a laptop computer, a desktop computer, or another type of computing device. The user device may include a display that provides an interface for the user to input information. For example, as discussed in more detail below, the user device may display an interface through which the user may input structural characteristics of a rock bench to be blasted and a desired rock fragmentation size, and, in response to which, the user device may display all the blast plans that achieve the desired fragmentation size in a table and plotted on a graph. One or more user devices may be used for inputting information. For example, a first user at the blast area may use a tablet to input rock bench characteristics and a second user at a location remote from the blast area may input the desired rock fragmentation size on a desktop computer.

Interface display 300 includes a variety of buttons in a row along the top. These buttons provide the selection of information to be displayed on interface display 300. For example, as shown in FIG. 3, the button for "drill and blast" is selected. Accordingly, drill and blast information is displayed on interface display 300. Interface display 300 includes a variety of buttons in a column along the left side. These buttons provide the selection of information to be displayed on interface display 300. For example, the button for "analytics" is selected. Accordingly, analytics information is displayed on interface display 300. As discussed in more detail below, the selection of "drill and blast" and "analytics" causes information about a rock bench to be displayed in a box 312. Interface display 300 shows a map 302 of a blast area, including outlines of individual rock benches in the blast area. More specifically, map 302 shows a first rock bench 304, a second rock bench 306, a third rock bench 308, and a fourth rock bench 310. A legend identifies the fill patterns representing different ore types shown in map 302. For example, first rock bench 304 and third rock bench 308 have a fill representing leach. In another example, second rock bench 306 and fourth rock bench 310 have a fill pattern representing oxide. Knowing which type of ore a rock bench contains helps with selecting which rock bench to target in a DB event.

In FIG. 3, first rock bench 304 has been selected. Box 312 displays information about the selected rock bench. For example, box 312 displays the identification of first rock bench 304 as "East Pit" and further displays that first rock bench 304 has a planned blast date of Dec. 19, 2017, an ore type of leach, a rock type of massive, a rock density of 3 $\frac{t}{m^3}$, bench length of 150 m, and a bench depth of 70 m. When a user selects one of the other rock benches displayed in map 302, the same type of information about the selected rock bench is displayed with values specific to the selected rock bench. Interface display 300 includes a "work orders" button. When the "work orders" button is selected, existing work orders are displayed.

Figure 4:
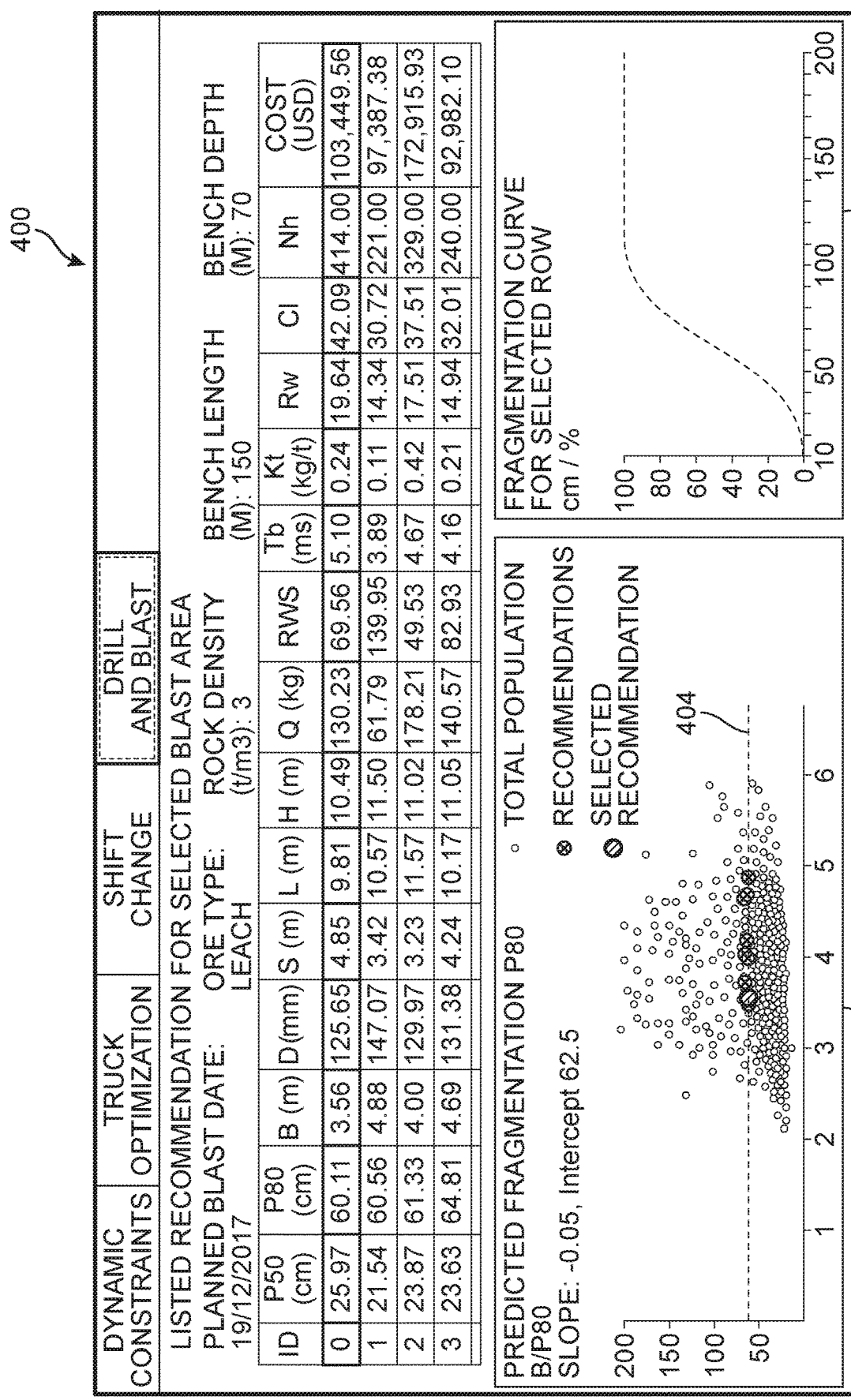
FIG. 4 is a schematic diagram of an embodiment of an interface display displaying an output table giving information about multiple DB event scenarios.

FIG. 4 shows an example of how DB blast scenarios can be displayed for a certain rock bench. FIGS. 5-7 show examples of various interface displays that allow a user to input characteristics of the DB event. The output shown in FIG. 4 is dependent upon the inputs from FIGS. 5-7. It is understood that different interface display tools than those shown may be used to allow a user to input information.

FIG. 5 shows an exemplary rock (structural) characteristics interface display 500 (or interface display 500) that appears when the tab for "rock characteristics" is selected. As shown in FIG. 5, the rock characteristics that can be input into the interface may include one or more of the following: rock type, joint condition factor, vertical joint plane angle, rock density, Young's modulus Y, Unconfined Compressive Strength ("UCS"), compressional stress wave velocity, and joint spacing. As shown in FIG. 5, interface display 500 displays three tabs for "rock type," "joint condition factor," and "vertical joint plane angle." In the example of FIG. 5, the tab for "rock type" is selected. FIG. 5 shows three rock types listed: friable, massive, and jointed. If "jointed" is selected, the joint spacing may be entered into a box 502. If a user selects "joint condition factor," a listing of the following four options are displayed for selection: no joints, tight joints, relaxed joints, and gauge fled joints. If a user selects "vertical joint plane angle," a listing of the following four options are displayed for selection: no joints, dip out of face, strike out of face, and dip into face. FIG. 5 shows a box 504 that allows the user to enter the rock density. FIG. 5 shows a box 506 that allows a user to enter Young's Modulus Y in Gpa. FIG. 5 shows a box 508 that allows a user to enter Unconfined Compressive Strength UCS in Mpa. FIG. 5 shows a box 510 that allows a user to enter compressional stress wave velocity in Mpa.

FIG. 6 shows an exemplary bench and drill parameters interface display 612 (or interface display 612) that appears when the tab for "bench and drill parameters" is selected. The bench and drill parameters that can be input into the bench and drill parameter interface may include one or more of the following: bench length, bench depth, standard deviation drilling precision, and standard deviation initiation precision. In the FIG. 6, a box 614 allows the user to enter the bench length in meters. FIG. 6 shows a box 616 that allows a user to enter the bench depth in meters. FIG. 6 shows a box 618 that allows a user to enter the standard deviation drilling precision in meters. FIG. 6 shows a box 620 that allows a user to enter the standard deviation initiation precision in meters. As shown in FIG. 6, interface display 612 displays two tabs for "P80 vs" and "P50 vs." Under each of these tabs, a plurality of selectable options are listed for items that can be plotted against the size of rock fragments resulting from DB events. The two tabs for "P80 vs" and "P50 vs." and the options listed below these tabs together provide a plot characteristics section of the interface display.

As shown in FIG. 6, when "P80 vs" is selected, the following options are listed: B (a burden, in meters); D (a diameter of the holes to be drilled, in mm); S (the space between holes to be drilled, in meters); L (a length of the holes to be drilled, in meters); H (height of the mine bench, in meters); Q (mass of explosive per hole, in kg); RWS (weight strength relative to ANFO); and $T_b$ (explosion delay between rows, in ms). Although not shown, it is understood that the same options may be listed when "P50 vs." is selected. The options listed under the tabs for "P80 vs" and "p50 vs" may be selected for plotting against the selected rock fragment size. For example, FIG. 4, described in more detail below, shows a table 400 plotting rock fragmentation size ranges (vertical axis) resulting from DB events against the burden (horizontal axis) correlating with the respective DB event, which is the option selected in FIG. 6. FIG. 6 shows a slide bar under a section identified as "Desired 80% Passing Rock Size (cm)." The slide bar allows a user to select a range of rock fragment sizes between two selectors. In the case of FIG. 6, the selected range is 60 cm to 65 cm. This selection means that the desired outcome is for 80% of the rocks resulting from the DB event to have a size within the range of 60 cm to 65 cm. Although not shown, when "p50 vs" is selected, a slide bar appears for selecting a range of rock fragment sizes for 50% of the population of rocks in a similar manner.

FIG. 7 illustrates an interface display 700 displaying prices of components under a tab labeled "blasting cost." Interface display 700 component pricing input section includes boxes for inputting prices of components of a DB event. For example, the input section includes a box 702 for inputting a price of explosives per kg. The input section further includes a box 704 for inputting a price of connectors per hole. The input section includes a box 706 for inputting a price of detonators per hole. The input section includes a box 708 for inputting a price of primer cost per hole. The input section includes a box 710 for inputting a price for drilling per meter. The input section includes a box 712 for inputting a price for the sum of miscellaneous costs per meter. These prices can be input to determine the cost of a DB event. These prices can be used for analysis of DB event scenarios generated in the step of generating multiple DB event scenarios discussed in more detail below. These prices can also be used during the step of generating a work order discussed in more detail below.

In response to the user inputs received by the system, the system provides multiple blast plans, or DB event scenarios, that can achieve the desired rock fragmentation size under the conditions of the blast area and the specifications of the drilling and blasting equipment. The parameters entered and selected in FIGS. 5-7 are then used to generate the output. For example, as shown in FIG. 4, the system gives an output table with all blast plans satisfying the input parameters. FIG. 4 shows four blast plans identified by numbers 0, 1, 2, and 3 in an output table. While only four blast plans appear in FIG. 4, it is understood that the table includes more blast plans that are not shown and that can be accessed by changing the view shown in a display interface. For example, in some embodiments, a scroll bar may be used to scroll down to a different part of the table. In another example, in other embodiments, a page number may be selected to change the display to a page that shows a different part of the table. The blast plans shown in the output table include various parameters of the blast plan. For example, in the embodiment of FIG. 4, for each blast plan, the output table displays the following: ID (an identification number); P50 (a fragment size for the 50$^{th}$ percentile, in cm); P80 (a fragment size for the 80$^{th}$ percentile, in cm); B (a burden, in meters); D (a diameter of the holes to be drilled, in mm); S (the space between holes to be drilled, in meters); L (a length of the holes to be drilled, in meters); H (height of the mine bench, in meters); Q (mass of explosive per hole, in kg); RWS (weight strength relative to ANFO); $T_b$ (explosion delay between rows, in ms); $K_t$ (powder factor, in kg/t); Rw (number of rows of the staggered pattern); CI (number of columns); Nh (number of holes to be drilled); and cost (in USD).

FIG. 4 shows table 400 plotting rock fragmentation size ranges resulting from DB events against the burden, which is the option selected in FIG. 6. The horizontal axis of the table represents the burden, and the vertical axis of the table represents the rock fragment size. As shown on table 400, the plot dots without a fill pattern represent rock fragment sizes from the total population of DB event scenarios plotted against the burden of the same DB event scenarios. The total population of DB event scenarios are, as described in more detail below, DB event scenarios generated in a simulation phase. The plot dots with a fill pattern represent rock fragment sizes from the recommended DB event scenarios that achieve the desired rock fragment size plotted against the burden of the same DB events scenarios. The recommended DB event scenarios can be recommended because these event scenarios fulfill other desired characteristics, such as desired price ranges or desired drill parameters. The plot dots with a fill pattern represent a rock fragment size from a selected DB event from the recommended DB events that achieve the desired rock fragment size plotted against the burden from the same selected DB event. In the example of FIG. 4, the DB event scenario identified by number 0 is selected. FIG. 4 shows a table 402 displaying the fragmentation curve for the selected DB event from the recommended DB events. In table 402, the horizontal axis represents the rock fragment size in cm, and the vertical line represents the percentage of the rock fragments. A line 404 shows the desired rock fragmentation size.

As discussed in more detail below, the control system can perform a simulation to generate multiple DB event scenarios. The control system can analyze the multiple DB event scenarios to determine which scenarios result in a desired rock fragment size. For example, a Monte Carlo simulation and a Kuz-Ram rock fragmentation model can be used together to generate blast plans satisfying the user input parameters. A Monte Carlo simulation is a methodology that uses the aggregated results of repeated random sampling to obtain a solution to a mathematical problem. A Kuz-Ram rock fragmentation model uses the parameters that are involved in a DB event to predict the rock fragmentation size resulting from the DB event. The Kuz-Ram rock fragmentation model uses three fundamental equations: the Kuznetsov equation, the Rosin-Rammler equation, and the Uniformity equation.

The Kuznetsov equation gives the average size $x_m$ of the fragmented rocks. The Rosin-Rammler equation gives the mass fraction of rocks with the size larger than a threshold value. The Uniformity equation gives the uniformity index for the mass fraction computation.

The Kuznetsov equation is $$x_m = AA_t K^{-\frac{4}{5}} Q^{\frac{1}{6}} \left(\frac{115}{RWS}\right)^{\frac{19}{20}}$$

where A is the rock factor (varying between 0.8 and 22) function of the rock physical characteristics; $A_t$ is the time delay factor that accounts for the introduction of time delay between subsequent explosions of row's holes; K is the powder factor usually defined as the total mass of explosive $E_t$ divided by the total cube meters of rock to fragment $V_t$, $$K = \frac{E_t}{V_t};$$

Q is the mass of the explosive per hole, and RWS is the explosive weight strength relative to Ammonium Nitrate Fuel Oil ("ANFO"), with the RWS of the Trinitrotoluene ("TNT") $RWS_{TNT}=115$. In the present formulation of the Kuz Ram rock fragmentation model, the powder factor has been computed as the amount of explosive needed to blast one hole unit, as $$K = \frac{Q}{B \times S \times H}$$

with B, S, and H as the hole's burden (distance between the hole and the free face of the rock bench), the hole's spacing (distance between two holes in a row), and bench's height, respectively.

The Rosin-Rammler equation is $$R_x = e^{\left(\frac{x}{x_m}\right)^n}$$

where n is the uniformity index, and is usually between 0.7 and 2.

The uniformity index is a function of the geometric characteristics of a DB event. The version of the Kuz-Ram model utilized by the control system uses the following equation for the uniformity index:

$$n_u = n_s \sqrt{\left(2 - \frac{30B}{D}\right)} \sqrt{0.5\left(1 + \frac{S}{B}\right)} \left(1 - \frac{W}{B}\right) \left(\frac{L}{H}\right)^{0.3} C(n)$$

where D is the hole diameter, L is the hole length, W is the standard deviation of the drilling precision, C(n) is a correction factor (here assumed 1), and $n_s$ is the uniformity factor, computed as $$n_s = 0.206 + \left(1 - \frac{R_s}{4}\right)^{0.8}.$$

In the latter, the scatter ratio $R_s$ incorporates the effects of the timing scatter in the uniformity of the fragmentation and is computed as $$R_s = \frac{T_r}{T_h} = \sigma \frac{\sigma_t}{T_h}$$

with $T_r$ being the range of the blasting delay scatter for initiation system, $T_h$ the blasting delay between hole rows (equal to the delay per meter $T_b$ times the burden B), and $\sigma_t$ the standard deviation of the explosion initiation system. In the current Kuz-Ram implementation, both uniformity prescriptions can be implemented.

An equation for the 80% passing size of the fragments produced in a DB event can be derived from the above equations. This is given as $$x_{80} = \frac{x_m}{0.4306^{\frac{1}{n}}}$$

which can be easily derived for any fraction of the total fragmented rocks.

The control system gathers the inputs (e.g., parameters and characteristics) that are known and uses them in the above equations. The control system also uses synthetic values, or simulation variables, for the unknown parameters (e.g., $A_t$ or Q). The control system determines which simulation variables to use for the unknown parameters. For example, method 900 includes step 908 of determining simulation variables. Below is a description of how the control system determines the simulation variables and uses these simulation variables to generate DB event scenarios.

During the simulation phase, a large number of DB events that are possible in a particular mine are synthesized on the bases of the characteristics of the mine in object. The control system uses Monte Carlo techniques to simulate a very large number of DB events by synthesizing all the parameters that are involved in the DB process, and uses the Kuz-Ram model to evaluate the outcome of each event in terms of rock fragment sizes. Each synthetic DB event is characterized by a randomly assigned value, or simulation variable, for each unknown parameter involved in the event.

The characteristics of the statistical distributions used to simulate the simulation variables can be tailored to the blast area to be studied. In other words, the simulation variables can be determined based on constraints of characteristics of the DB event. This means that the control system determines constraints for simulation variables. For example, method 900 includes a step 906 of determining constraints for simulation variables. In one instance, if the control system is to simulate 1,000 DB events for a mine that has a drilling device able to drill holes in the range 20 to 62 cm, the constraint for the simulation variables is that the drill holes will not be smaller than 20 cm or larger than 62 cm. In this case, the control system randomly generates 1,000 values from 20 to 62 cm. These 1,000 values are simulation variables for drill diameter. The shape of the distribution used to generate the random point is selected using the knowledge of other mine characteristics: a Normal distribution will be chosen if the largest part of holes has 40 cm diameter while a logNormal distribution will be chosen if the largest part of holes has 20 cm diameter and so on. When the control system determines the constraints for the simulation variables and uses these constraints to determine the simulation variables, the control system uses the constraints to limit the possibilities for the simulation variables. Once the control system determines the simulation variables, the control system can generate multiple DB event scenarios based on the DB event characteristic inputs and the simulation variables. For example, method 900 includes a step 910 of generating multiple DB event scenarios based on DB event characteristic inputs and simulation variables. The DB event characteristics may include one or more of: rock characteristics of the rock bench, bench characteristics of the rock bench, drill parameters of the equipment selected for execution of the DB event, and prices of components of the DB event. Once the control system simulates all DB synthetic parameters (or simulation variables) according to this technique, the control system will have multiple synthetic and completely defined DB events.

In another example, if the drilling device being used in the planned DB event can drill only 20 cm holes, the diameter of the holes will not be synthesized, and all the 1,000 synthetic DB events will have the same drill diameter of 20 cm. In this case, the constraint for the simulation variable is that the drill holes will not be larger or smaller than 20 cm. In yet another example, if only a first drill bit yielding a 20 cm diameter and a second drill bit yielding a 30 cm diameter are available, then all the 1,000 synthetic DB events will have either a 20 cm or 30 cm diameter. In this case, the simulation variables for drill diameter are 20 cm and 30 cm, and the constraint is that the simulation variables cannot have a value different from 20 cm or 30 cm.

After the simulation phase concludes, the control system uses the Kuz-Ram model to compute the rock fragmentation size for each simulated DB event. For example, method 900 includes a step 912 of determining generated DB events that result in the desired rock fragment size. The Kuz-Ram model output consists of a number of qualifiers of the rock fragmentation resulting from the DB event, including the rock fragment size that represents a certain percentile of the distribution. For example, the $80^{th}$ percentile ("p80") may be desired for a certain DB event. In this example, a user can select all synthetic DB events that would achieve a certain rock fragment size and use the parameters resulting from the Monte Carlo simulation and the Kuz-Ram model to implement a real DB event.

The blast plan control system may include a step of receiving a selection of a DB event to be executed. For example, method 900 includes a step 914 of receiving a selection of a DB event to be executed. A user may select a DB event for execution from the multiple generated DB event scenarios by analyzing different scenarios by changing various inputs (for example, inputs shown in FIGS. 5-6) and manipulating the display of the outputs (for example, DB scenarios shown in FIG. 4) to see how adjusting different inputs may affect the outputs. As discussed above, all of the input boxes in the various interface displays may be interactive such that inputs may be changed in real time. Thus, the inputs may be changed, and these inputs will automatically change the outputs that are displayed. As discussed above, changing the desired rock fragment size as an input will change how the interface display in FIG. 4 displays information about the DB event scenarios. For example, the recommended DB event scenarios may change in response to selecting a different desired rock fragment size. Additionally, as discussed above, a user may select a particular DB event scenario to compare the DB event scenario against other DB event scenarios.

Figure 8:
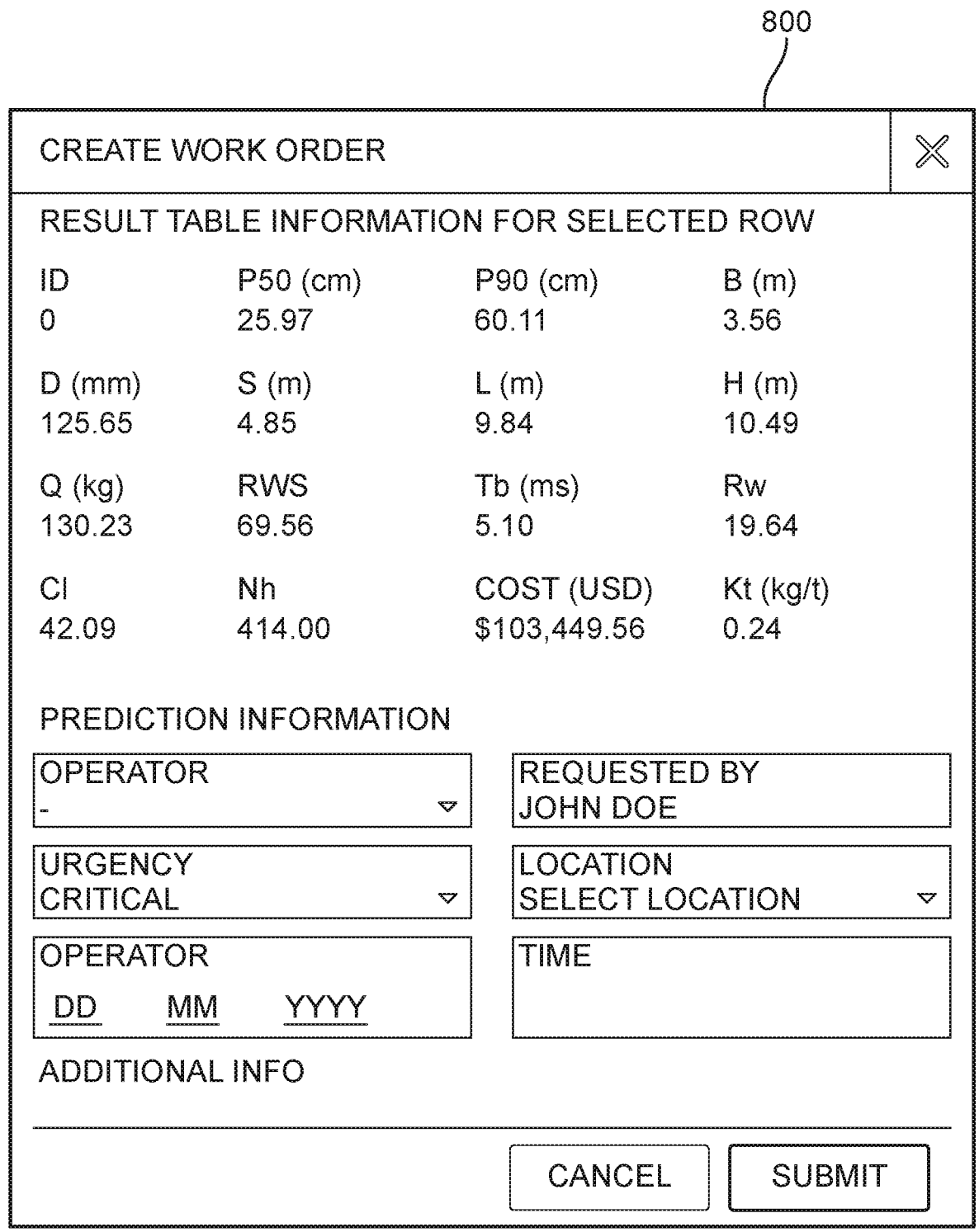
FIG. 8 is a schematic diagram of an embodiment of an interface display displaying a work order.

The blast plan control system may include generating a work order. For example, method 900 includes a step 916 of generating a work order. FIG. 8 shows an example of a work order 800. In some embodiments, the work order may be generated in response to a user selecting a "work order" button on an interface display. For example, a user may select the "work order" button on one of the interface displays shown in FIGS. 5-7. As shown in FIG. 8, a work order may include various characteristics of a DB event. For example, FIG. 8 shows the characteristics for the selected DB event scenario in FIG. 4. The characteristics are the same as those shown in the table in FIG. 4. Work order 800 is incomplete, but it shows the boxes where prediction information can be displayed. For example, work order 800 shows boxes for listing the operator, the person requesting the DB event, the urgency of the DB event, the location of the DB event, the date the DB event is to take place, and the time the DB event is to take place. These boxes may be filled out by a user planning the DB event and/or by the control system based on information previously received by the control system.

Once a DB event scenario is selected and a work order is generated, the blast plan control system may communicate DB event specifications of the selected drill and blast event to operators responsible for executing the DB event and/or to drilling equipment to be used during execution of the DB event. For example, method 900 includes a step 918 of communicating DB event specifications of the selected DB event to operators responsible for executing the DB event and/or to drilling equipment to be used during execution of the drill and blast event. In some embodiments, the control system may perform this step by sending the work order to operators responsible for executing the DB event and/or to drilling equipment to be used during execution of the DB event. Once the parameters to implement the real DB event have been communicated to operators responsible for executing the DB event and/or to drilling equipment to be used during execution of the DB event, the DB event may be planned and executed. In some embodiments, the Internet of Things platform can interact directly with all mine offices to run an order of the material needed to implement the DB event. For example, in response to receiving the work order, the control system can prepare and submit an order for material, such as explosive and/or a drill bit for the drilling equipment. In some embodiments, the drilling equipment can automatically perform drilling and blasting functions, such as drilling holes, in accordance with the specifications of the work order. In some embodiments, the drilling equipment, such as trucks and processing machinery, may prepare for hauling and processing rock fragments.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of controlling a drill and blast event, comprising:
   receiving, by a control system, a desired rock fragment size for a desired percentage of the population of rock fragments resulting from the drill and blast event;
   receiving, by the control system, drill and blast event characteristic inputs;
   determining, by the control system, simulation variables to be used in place of unknown parameters, wherein the simulation variables include randomly selected values generated by selecting a shape of distribution based on drill and blast characteristic inputs and wherein the shape of distribution is one or both of Normal and logNormal;
   generating, by the control system, multiple drill and blast event scenarios based on drill and blast characteristic inputs and simulation variables in place of unknown parameters;
   determining, by the control system, drill and blast event scenarios comprising drill and blast event specifications for drill and blast events that result in the desired rock fragment size for a desired percentage of the population of rock fragments;
   receiving, by the control system, drill and blast event specifications selected from the multiple drill and blast event scenarios;
   communicating, via the Internet of Things, by the control system, the selected drill and blast event specifications to at least the drilling equipment to be used during execution of the drill and blast event; and executing the selected drill and blast event by at least the drilling equipment to be used during execution of the selected drill and blast event.

2. The method of claim 1, wherein the drill and blast characteristic inputs include rock characteristics and bench characteristics of a rock bench that is a target of the selected drill and blast event as well as drill parameters of equipment that is to be used in the selected drill and blast event.

3. The method of claim 1, wherein generating, by the control system, multiple drill and blast event scenarios includes running a Monte Carlo simulation.

4. The method of claim 1, further comprising:
determining, by the control system, constraints for the simulation variables, and applying the constraints to restrict the simulation variables to values inside of a range defined by the constraints.

5. The method of claim 4, wherein the constraints are based on the drill and blast event characteristic inputs.

6. The method of claim 1, wherein the simulation variables and the drill and blast event characteristic inputs are used in a Kuz-Ram rock fragmentation model when determining, by the control system, drill and blast event scenarios.

7. The method of claim 1, further comprising:
preparing and submitting, by the control system, an order of material for implementing the drill and blast event.

8. The method of claim 1, wherein the drill and blast event specifications include the measurements of holes that are to be drilled into a rock bench that is a target of the selected drill and blast event, as well as the cost of the corresponding drill and blast event.

9. The method of claim 8, further comprising:
displaying a plot of the rock fragmentation sizes resulting from multiple drill and blast event scenarios against the drill and blast event specifications correlating with the respective drill and blast event scenario.

10. The method of claim 1, further comprising:
generating, by the control system, a work order including the drill and blast event specifications of the selected drill and blast event, wherein communicating, by the control system, the selected drill and blast event specifications to at least the drilling equipment to be used during execution of the drill and blast event includes sending, via the Internet of Things, the work order to at least the drilling equipment to be used during execution of the drill and blast event.

11. A non-transitory computer-readable medium storing software comprising instructions executable by one or more computers which, upon such execution, cause the one or more computers to:
receive, by a control system, a desired rock fragment size for a desired percentage of the population of rock fragments resulting from the drill and blast event;
receive, by the control system, drill and blast event characteristic inputs;
determine, by the control system, simulation variables to be used in place of unknown parameters, wherein the simulation variables include randomly selected values generated by selecting a shape of distribution based on drill and blast characteristic inputs and wherein the shape of distribution is one or both of Normal and logNormal;
generate, by the control system, multiple drill and blast event scenarios based on drill and blast characteristic inputs and simulation variables in place of unknown parameters;
determine, by the control system, drill and blast event scenarios comprising drill and blast event specifications for drill and blast events that result in the desired rock fragment size for a desired percentage of the population of rock fragments;
receive, by the control system, drill and blast event specifications selected from the multiple drill and blast event scenarios;
communicate, via the Internet of Things, by the control system, the selected drill and blast event specifications to at least the drilling equipment to be used during execution of the drill and blast event; and
execute the selected drill and blast event by at least the drilling equipment to be used during execution of the selected drill and blast event.

12. The non-transitory computer-readable medium storing software of claim 11, wherein the instructions executable by one or more computers, upon such execution, cause the one or more computers to determine, by the control system, constraints for the simulation variables, and applying the constraints to restrict the simulation variables to values inside of a range defined by the constraints.

13. The non-transitory computer-readable medium storing software of claim 12, wherein the constraints are based on the drill and blast event characteristic inputs and wherein the drill and blast event specifications include an amount of resources for use in the selected drill and blast event.

14. The non-transitory computer-readable medium storing software of claim 11, wherein generating, by the control system, multiple drill and blast event scenarios includes running a Monte Carlo simulation.

15. The non-transitory computer-readable medium storing software of claim 13, wherein the amount of resources includes material for implementing the drill and blast event.

16. A control system for controlling a drill and blast event, comprising:
one or more computers and one or more storage devices storing instructions that are operable, when executed by the one or more computers, to cause the one or more computers to:
receive, by a control system, a desired rock fragment size for a desired percentage of the population of rock fragments resulting from the drill and blast event;
receive, by the control system, drill and blast event characteristic inputs;
determine, by the control system, simulation variables to be used in place of unknown parameters, wherein the simulation variables include randomly selected values generated by selecting a shape of distribution based on drill and blast characteristic inputs and wherein the shape of distribution is one or both of Normal and logNormal;
generate, by the control system, multiple drill and blast event scenarios based on drill and blast characteristic inputs and simulation variables in place of unknown parameters;
determine, by the control system, drill and blast event scenarios comprising drill and blast event specifications for drill and blast events that result in the desired rock fragment size for a desired percentage of the population of rock fragments;
receive, by the control system, drill and blast event specifications selected from the multiple drill and blast event scenarios;
communicate, via the Internet of Things, by the control system, the selected drill and blast event specifications to at least the drilling equipment to be used during execution of the drill and blast event; and execute the selected drill and blast event by at least the drilling equipment to be used during execution of the selected drill and blast event.

17. The control system of claim 16, wherein the instructions executable by one or more computers, upon such execution, cause the one or more computers to determine, by the control system, constraints for the simulation variables, and applying the constraints to restrict the simulation variables to values inside of a range defined by the constraints.

18. The control system of claim 17, wherein the constraints are based on the drill and blast event characteristic inputs and wherein the drill and blast event specifications include an amount of resources for use in the selected drill and blast event.

19. The control system of claim 16, wherein generating, by the control system, multiple drill and blast event scenarios includes running a Monte Carlo simulation.

20. The control system of claim 18, wherein the amount of resources includes material for implementing the drill and blast event.

* * * * *